(12) United States Patent
Curry, V

(10) Patent No.: US 9,937,830 B1
(45) Date of Patent: Apr. 10, 2018

(54) CHILD PASSENGER SAFETY SEAT EMERGENCY COOLING AND NOTIFICATION SYSTEM

(71) Applicant: Bishop Benjamin Curry, V, McKinney, TX (US)

(72) Inventor: Bishop Benjamin Curry, V, McKinney, TX (US)

(*) Notice: Subject to any disclaimer, the term of this patent is extended or adjusted under 35 U.S.C. 154(b) by 0 days.

(21) Appl. No.: 15/608,494

(22) Filed: May 30, 2017

Related U.S. Application Data

(60) Provisional application No. 62/406,251, filed on Oct. 10, 2016.

(51) Int. Cl.
| | |
|---|---|
| *B60N 2/00* | (2006.01) |
| *G08B 21/02* | (2006.01) |
| *B60N 2/48* | (2006.01) |
| *G08B 25/00* | (2006.01) |

(52) U.S. Cl.
CPC .......... *B60N 2/4876* (2013.01); *B60N 2/002* (2013.01); *G08B 21/0211* (2013.01); *G08B 25/00* (2013.01)

(58) Field of Classification Search
CPC ........ B60N 2/002; B60N 2/26; B60N 2/2812; B60N 2/56; B60N 2/5692; G08B 21/22; G08B 21/24; G08B 21/02; G08B 25/005; B60H 1/00742; B60H 1/00021; B60H 1/00207; B60H 1/00285; A47C 7/74; B60R 21/015

See application file for complete search history.

(56) References Cited

U.S. PATENT DOCUMENTS

| 4,658,597 | A  | * | 4/1987 | Shum | B60H 1/00428 136/236.1 |
|---|---|---|---|---|---|
| 6,394,543 | B1 | * | 5/2002 | Dunne | B60N 2/2806 297/219.12 |
| 7,320,223 | B1 | * | 1/2008 | Dabney | B60N 2/28 62/244 |
| 7,378,979 | B2 | * | 5/2008 | Rams, Jr. | B60N 2/002 180/271 |
| 7,466,217 | B1 | * | 12/2008 | Johnson | B60N 2/002 180/268 |
| 7,714,737 | B1 | * | 5/2010 | Morningstar | B60N 2/002 180/271 |
| 8,063,788 | B1 | * | 11/2011 | Morningstar | B60N 2/002 180/271 |
| 8,125,343 | B2 | * | 2/2012 | Denale | B60N 2/002 340/457 |

(Continued)

*Primary Examiner* — Fekadeselassie Girma

(57) ABSTRACT

A system for detecting hot car seat situations, manually cooling the child in those situations, and facilitating one or more alert notifications is disclosed. An apparatus receives sensor data that it uses to detect the presence of a child in a car seat in a vehicle. Multiple sensors provide added security against false positives. When a child is detected, the apparatus activates a cooling flow of air towards the child if the temperature rises above a threshold. The apparatus waits until the vehicle is not moving and off before initiating notifications to one or more subscribing devices. Once off, and once the temperature of the child further rises or has the air flow on for a period of time, the apparatus sends a notification to the subscribing devices. If the child is not removed within a set period of time, then emergency responders are notified.

20 Claims, 9 Drawing Sheets

(56) References Cited

U.S. PATENT DOCUMENTS

| | | | | |
|---|---|---|---|---|
| 8,225,422 B1* | 7/2012 | McSparron | A41B 13/005 | 2/67 |
| 8,232,874 B1* | 7/2012 | Aneiros | B60H 1/00657 | 340/438 |
| 8,655,547 B1* | 2/2014 | Steele | B60N 2/002 | 701/36 |
| 8,892,302 B1* | 11/2014 | McDonald | G08B 21/24 | 701/36 |
| 9,041,523 B1* | 5/2015 | Birdis | B60N 2/002 | 180/273 |
| 9,139,128 B1* | 9/2015 | Lemons | B60Q 1/00 | |
| 9,202,316 B1* | 12/2015 | Trudell | G07C 5/00 | |
| 9,227,484 B1* | 1/2016 | Justice | B60N 2/002 | |
| 9,266,535 B2* | 2/2016 | Schoenberg | B60N 2/28 | |
| 9,378,641 B2* | 6/2016 | Beumler | B60N 2/28 | |
| 9,403,437 B1* | 8/2016 | McDonald | B60K 37/02 | |
| 9,417,078 B1* | 8/2016 | Seibert | G07C 5/0858 | |
| 9,569,948 B1* | 2/2017 | Platt | G08B 21/24 | |
| 9,663,032 B1* | 5/2017 | Appukutty | B60Q 9/00 | |
| 2004/0056013 A1* | 3/2004 | Holmgren | B60N 2/2809 | 219/217 |
| 2005/0200465 A1* | 9/2005 | Fabors | B60Q 1/50 | 340/457 |
| 2006/0000592 A1* | 1/2006 | Bosquet | B60H 1/00021 | 165/202 |
| 2007/0102079 A1* | 5/2007 | Billock | B60N 2/6063 | 150/154 |
| 2007/0120400 A1* | 5/2007 | Westh | A47C 7/74 | 297/180.13 |
| 2008/0136231 A1* | 6/2008 | Doherty | B60N 2/2881 | 297/219.12 |
| 2009/0146813 A1* | 6/2009 | Nuno | G08B 21/22 | 340/572.1 |
| 2009/0204297 A1* | 8/2009 | Friedman | B60H 1/00742 | 701/46 |
| 2009/0277190 A1* | 11/2009 | Piette | B60H 1/00264 | 62/56 |
| 2010/0133883 A1* | 6/2010 | Walker | A47C 7/74 | 297/180.1 |
| 2011/0231862 A1* | 9/2011 | Walsh | G06F 13/00 | 719/318 |
| 2011/0241867 A1* | 10/2011 | Neal | B60N 2/002 | 340/457 |
| 2011/0267186 A1* | 11/2011 | Rao | B60K 28/08 | 340/449 |
| 2012/0140080 A1* | 6/2012 | Taylor | B60C 23/0408 | 348/148 |
| 2012/0232749 A1* | 9/2012 | Schoenberg | B60N 2/002 | 701/36 |
| 2013/0020852 A1* | 1/2013 | Corcoran | B60N 2/2222 | 297/452.18 |
| 2013/0033373 A1* | 2/2013 | Thomas | B60N 2/002 | 340/457.1 |
| 2013/0049955 A1* | 2/2013 | Hoover | B60N 2/28 | 340/539.11 |
| 2013/0201013 A1* | 8/2013 | Schoenberg | B60R 22/48 | 340/438 |
| 2014/0077967 A1* | 3/2014 | Alvarez Osuna | A61B 5/0026 | 340/870.01 |
| 2014/0239681 A1* | 8/2014 | Bourgoin | A47D 15/00 | 297/184.13 |
| 2014/0253314 A1* | 9/2014 | Rambadt | B60N 2/002 | 340/457.1 |
| 2014/0277935 A1* | 9/2014 | Daman | G08G 1/127 | 701/36 |
| 2014/0306838 A1* | 10/2014 | Beumler | B60N 2/28 | 340/988 |
| 2015/0099445 A1* | 4/2015 | Ashburn | B60N 2/56 | 454/152 |
| 2016/0042624 A1* | 2/2016 | Quave | B60N 2/002 | 340/457 |
| 2016/0075296 A1* | 3/2016 | Alderman | G08G 1/127 | 340/989 |
| 2016/0076830 A1* | 3/2016 | Repp | B60N 2/5614 | 165/287 |
| 2016/0272112 A1* | 9/2016 | Degrazia | B60Q 9/00 | |
| 2017/0096080 A1* | 4/2017 | McLean, Jr. | B60N 2/002 | |

* cited by examiner

CHILD PASSENGER SAFETY SEAT EMERGENCY COOLING AND NOTIFICATION SYSTEM

PRIORITY

This patent application claims priority to and the benefit of U.S. Provisional Patent Application 62/406,251, filed on Oct. 10, 2016, which is incorporated by reference herein in its entirety.

TECHNICAL FIELD

The present description relates to preventing hot car seat deaths, and more specifically, to apparatus, systems, methods, and machine-readable media for detecting hot car seat situations, manually cooling the child in those situations, and facilitating one or more alert notifications.

BACKGROUND

Every year, dozens of children in the United States of America tragically pass away due to what is colloquially referred to as "hot car seat deaths," or situations where a child is left in a vehicle for an extended period of time and are unable to escape. Hot car seat deaths typically occur in situations where a caregiver forgets to remove a child from a car seat and leaves the child (typically ranging from 0 to 3 or 4 years old, though that is an example only) unattended in a car with the engine off.

In these situations, temperatures in cars can rise rapidly due to the greenhouse effect within the cabin of the car, for example on the order of tens of degrees Fahrenheit within half an hour. Young children's nervous systems are less developed for proper thermoregulation, and thus are more susceptible to swings in temperatures including dramatic increases in heat. As the heat rapidly increases, hyperthermia can set in on a young child quickly, even within 15 minutes in some cases.

Current known approaches attempt to resolve this problem by providing a system in vehicles that sound an audible alarm when weight is sensed in a rear seat region, i.e., reminding the driver (or other passenger) to check the rear seat prior to exiting the vehicle. But this approach is still deficient; there is a chance for false positives if something besides a child is placed on the rear seat region. Audible alarms within the vehicle itself could be ignored, misunderstood, drowned out, etc., thus failing to provide the notification necessary to the caregiver. Further, these approaches do nothing to ameliorate the rising temperature of the vehicle cabin until the child is rescued.

Accordingly, the potential remains for improvements that facilitate improved detection of children in a vehicle cabin in a dangerous situation, mitigation of temperature increases of the young child during the dangerous situation, and notification of caregivers and/or emergency responders before too much time has passed.

BRIEF DESCRIPTION OF THE DRAWINGS

The present disclosure is best understood from the following detailed description when read with the accompanying figures. In accordance with the standard practice in the industry, various features are not drawn to scale. In fact, the dimensions of the various features may be arbitrarily increased or reduced for clarity of discussion.

DETAILED DESCRIPTION

Figure 1:
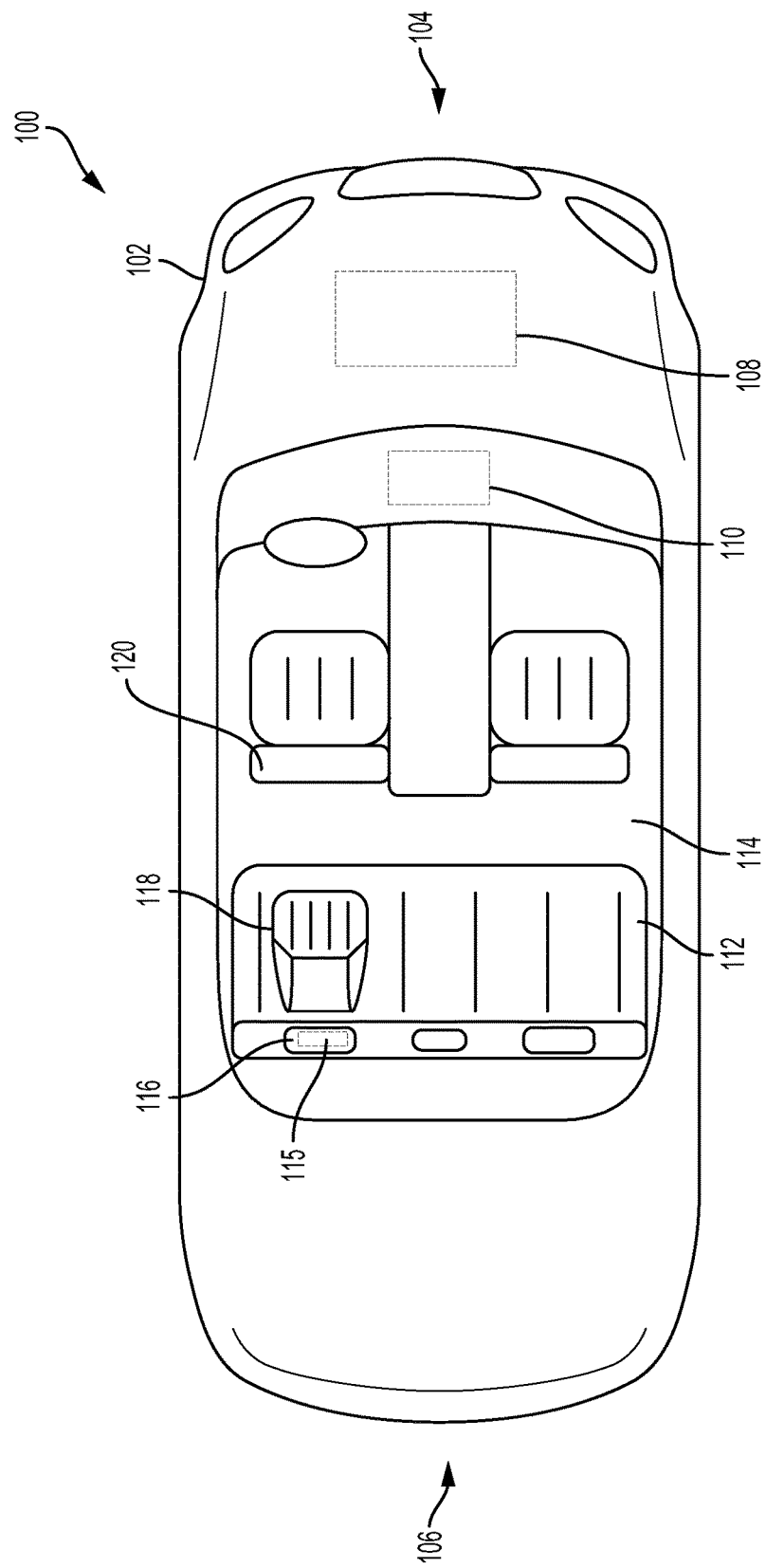
FIG. 1 illustrates an exemplary vehicle environment according to aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for detecting hot car seat situations, manually cooling the child in those situations, and facilitating one or more alert notifications.

According to embodiments of the present disclosure, an emergency cooling apparatus includes, or communicates with, multiple different sensors. The emergency cooling apparatus is positioned near a car seat for a child. A subset of the sensors is used to detect whether a child is present in the child car seat. Multiple different sensor inputs may be used in conjunction with each other so as to mitigate the possibility of false positives.

If a child is detected in the car seat, then the emergency cooling apparatus may use another subset of sensors to determine a health parameter of the child, at the least temperature. Further, the emergency cooling apparatus determines, through other sensor measurements and/or communication with a computer of the vehicle in which the car seat is situated, whether the vehicle is stationary and the engine is off. If the temperature of the child passes above a threshold, then the emergency cooling apparatus activates and supplies a flow of air (e.g., cooled air), toward the child. This may occur whether the vehicle is moving or not, and running or not.

In some implementations, if the vehicle has been determined to be not moving with the engine off, then the emergency cooling apparatus is triggered to generate a notification to send to one or more subscribing devices. This trigger may arise from the detected temperature of the child, the cabin, or some combination of both rising above set threshold values, or the supply of the flow occurring for longer than a set period of time. The notification may include information about the child's temperature, location, how long the child has been detected in the car, and any other useful parameters.

In some implementations, if the user of the subscribing device does not confirm receipt, additional notifications may be sent over a given period of time (e.g., 5 to 10 minutes). After a period of time elapses, then the emergency cooling apparatus may generate another notification and send that notification to one or more emergency responders (e.g., fire, police, private contractors, etc.). Further, even if receipt is confirmed, but the child remains detected in the vehicle, then the notification to emergency responders is generated and sent, thereby ensuring that the child does not remain in the vehicle long enough to fall victim to hyperthermia.

As a result, embodiments of the present disclosure improve upon detection of children in a vehicle cabin in a dangerous situation, lower a temperature of the child during the dangerous situation, and notify caregivers and/or emergency responders according to a pre-established schedule. The apparatus is therefore further improved with the ability to provide cooling to the trapped child until assistance arrives.

FIG. 1 illustrates an exemplary vehicle environment 100 according to aspects of the present disclosure. The vehicle environment 100 could assume a variety of forms, whether it be an automobile (also referred to as a "car"), a train, or an airplane. Generally, reference will be made herein to a "vehicle" or a "car" for purposes of simplicity of discussion.

The vehicle environment includes the vehicle 102, with a front end 104 and a rear end 106. The vehicle 102 includes an engine 108 illustrated near the front end 104 (although the engine could be located elsewhere, with reference to "engine" being to any form of propulsion, for example internal combustion, electric motor, fuel cell, etc.). The vehicle 102 includes a cabin 114 with sufficient space available for at least one car seat 118. The cabin 114 includes front seats 120 (i.e., one or more bucket seats, a bench, etc.) in the direction towards the front end 104 and rear seat 112 (i.e., a bench, one or more bucket seats, etc.) in the direction towards the rear end 106.

The vehicle 102 may also include a computer 110. Computer 110 is illustrated in FIG. 1 as generally being located in the area of a dashboard of the vehicle 102, such as near or with the engine 108 (although it may be located in many different locations of the vehicle 102, including multiple different physical locations that operate with at least some functions in a coordinated fashion together). The computer 110 may include an operating system configured to receive and process various feedback signals from various sensors of the vehicle 102 and control various systems of the vehicle 102. For example, the computer 110 may receive inputs from speed sensors, fluid sensors (e.g., oxygen, fuel, etc.), pressure sensors, temperature sensors, throttle sensors, etc. The computer 110 may control aspects of operation including engine control, emissions control, etc. Further, the computer 110 my control different output aspects of the vehicle 102, such as several aspects of unit feedback presented to the driver or other passengers of the vehicle 102 (e.g., speed, rotations per minute (RPM), fuel level, direction, etc.). The computer 110 may also control information and entertainment ("infotainment") functions of the vehicle 102.

The computer 110, whether as a single functional unit or a collection of different computers, whether general-purpose or specifically programmed/built computers, may also control the climate control functions of the vehicle 102. The computer 110 may also include or interoperate with one or more networking systems, for example a Bluetooth transceiver, a Wi-Fi transceiver, and/or a cellular transceiver (to name just a few examples). Generally, reference to the computer 110 herein includes the one or multiple computers noted above as examples or others, whether dedicated to a specific tasks or more generally programmed for multiple tasks.

The vehicle 102 may include one or more car seats 118 for children. As illustrated, the car seat 118 is a separate unit from the rest of the vehicle 102 (i.e., manufactured separately and manually connected/installed with the vehicle 102 when desired). Embodiments of the present disclosure are also applicable to car seats 118 that are integrated with the vehicle 102, for example integrated with the rear seat 112. For simplicity of discussion, reference will be made herein to separately installed car seats 118 although the discussion will also apply generally to integrated car seats 118.

According to embodiments of the present disclosure, the computer 110 may communicate with a controller of an emergency cooling apparatus 115 attached to, directed towards (e.g., attached to a headrest 116 of the rear seat 112 or of the front seat 120), or integrated with the car seat 118. The emergency cooling apparatus 115 (and its corresponding controller) are illustrated in FIG. 1 attached to the headrest 116. This is exemplary only, and may be attached or associated with the front seat 120 or the car seat 118. The computer 110 and the controller of the emergency cooling apparatus 115 may communicate via a wireless (e.g., Bluetooth) or a wired connection. The computer 110 may communicate different sensor and status information to the controller of the emergency cooling apparatus 115, for example movement information, engine status information, climate control information, etc. The computer 110 may also receive information and/or instructions from the controller of the emergency cooling apparatus 115, for example an alert and/or a command to activate or modify climate control parameters, as will be discussed in more detail with respect to other figures below.

Figures 2A, 2B:
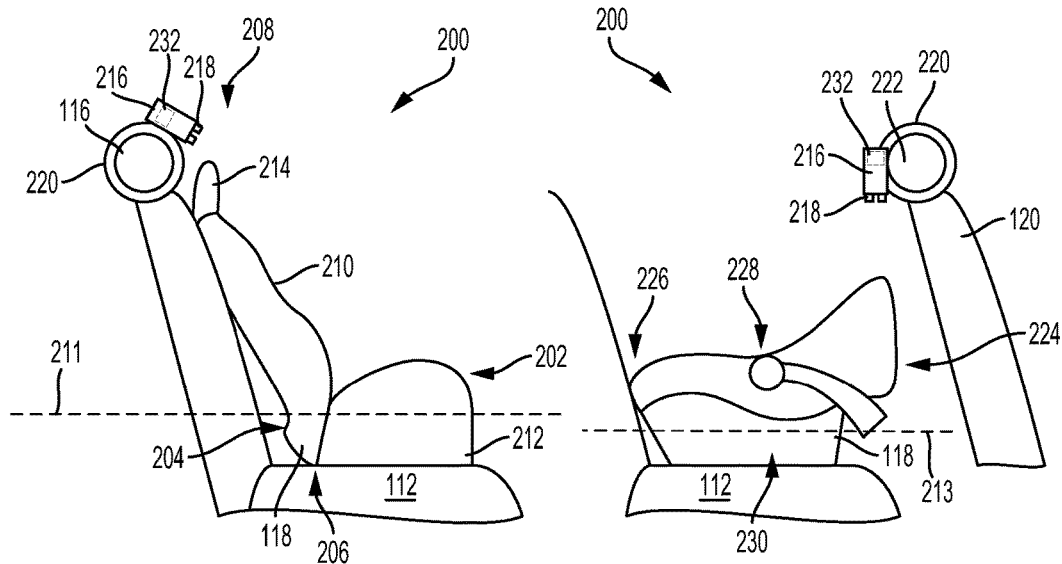
FIG. 2A is a side view of an exemplary emergency cooling system in an exemplary vehicle environment according to aspects of the present disclosure.
FIG. 2B is a side view of an exemplary emergency cooling system in an exemplary vehicle environment according to aspects of the present disclosure.

For example, FIG. 2A is a side view of an exemplary emergency cooling system in an exemplary vehicle environment, such as environment 100, according to aspects of the present disclosure. The emergency cooling system of FIG. 2A includes an emergency cooling apparatus 216, which is an example of the emergency cooling apparatus 115 from FIG. 1. In the embodiment of FIG. 2A, the emergency cooling apparatus 216 is releasably attached to the headrest 116 of the rear seat 112 of FIG. 1.

Also illustrated in FIG. 2A's embodiment is a child car seat 118 that is designed to be forward-facing in the vehicle 102. The child car seat 118 is illustrated from a side view, and includes a front portion 202 facing towards the front end 104 of the vehicle 102 of FIG. 1. The child car seat 118 also includes a rear portion 204 facing towards the rear end 106 of the vehicle 102 (the opposite end of the child car seat 118 along an axis 211 of a base 212 of the child car seat 118). The child car seat 118 also includes a backrest 210 extending from the base 212 (such as a bottom 206 of the base 212) to a top 208, with a portion including a child headrest 214 near the headrest 116. The child car seat 118 is merely exemplary, recognizing that the subject matter herein may operate with any child car seat configuration.

The emergency cooling apparatus 216 is attached to the headrest 116 in such a manner that it is facing the upper region of the child car seat 118 including the child headrest 214. For example, as illustrated in FIG. 2A the emergency cooling apparatus 216 is attached using a strap 220, which may be formed of one or more materials that either stretch or attach to respective ends of the strap 220 (e.g., via hook-and-loop fasteners, magnetic coupling, strap coupling, adhesive coupling, etc.). The strap 220 may be releaseable so that the emergency cooling apparatus 216 is attachable to multiple headrests 116 over time, as desired. In other embodiments, the emergency cooling apparatus 216 may be releasably attached to the child car seat 118 instead, such as to the child headrest 214 or a side of the child car seat 118 in the region of the backrest 210 (just to name a few examples).

The emergency cooling apparatus 216 includes one or more nozzles 218 which direct a flow of air towards a child determined to be in the child car seat 118. The nozzles 218 may be fixed in direction or may have an adjustable connection to the rest of the emergency cooling apparatus 216 to further allow manipulation of the direction of the air flow.

As will be illustrated in later figures and discussed further with respect to those figures below, the emergency cooling apparatus 216 includes a controller to control various aspects of the present disclosure (illustrated in FIG. 2A as controller 232 part of the emergency cooling apparatus 216). For example, the controller 232 is configured to control one or more sensors in communication therewith that are used to detect the presence of a child in the child car seat 118. Sensors could include weight sensors, proximity (e.g., capacitive) sensors, infrared sensors, sound sensors, temperature sensors, other sensor types and/or some combination of the above. The controller 232 receives inputs from one or more of the sensors and makes a determination of whether a child is in the child car seat 118. Further, the controller 232 may communicate with the vehicle 102, e.g. with and via the computer 110, to determine a status of the vehicle 102 (e.g., engine running, moving, stationary, climate control activated, etc.).

If the controller 232 determines that a child is in the child car seat 118 (and the vehicle 102 is either not running or, if the engine is running, the climate control is not activated as some examples), the controller 232 further may make a determination about a health parameter of the child. For example, the controller 232 may receive temperature data from a temperature sensor (one or multiple sensors, and/or one or multiple instances of data) and compare that temperature data against either a baseline temperature, a last-known temperature of the child (e.g., to obtain a differential between the two), or both. If the temperature has risen above a predetermined threshold (whether a temperature threshold, such as 102° F. or a differential change, such as 5° F. as just two exemplary values), such as a first threshold, then the controller 232 may activate a cooling function of the emergency cooling apparatus 216.

The cooling may continue until the detected temperature of the child in the child car seat 118 falls below a temperature threshold (e.g., 100° F. or a differential value of 3° or so, just to name a few non-limiting numeric examples), at which time the cooling might deactivate again. The thresholds may differ so as to incorporate hysteresis into the control system. If the cooling continues for a specified duration of time, or if the detected temperature of the child continues rising above another threshold (higher than the first threshold, for example, such as one degree higher or two degrees higher), then the controller 232 may generate and transmit one or more notifications to one or more subscribing devices.

For example, a caregiver may have an application ("app") installed on their mobile device that is configured to receive notifications conveyed to the mobile device from the controller 232. The notification may include at least a message identifying the detected presence of a child, as well as other parameters such as a last-measured temperature of the child, a duration of time that the child has been detected in the child car seat 118, a geographic location of the emergency cooling apparatus 216 (and, thus, of the child), and a request for confirmation of receipt of the message to name just a few examples. This notification to the caregiver's app (also referred to generally as the subscriber's app) may be sent concurrent to the cooling activating (i.e., at the threshold trigger), after a period of time of cooling, after the child's detected temperature continues to climb above another threshold as indicated above, or some combination thereof.

The controller 232 may further generate and transmit one or more notifications to emergency responders, e.g. a fire department, a police department, a private contractor, etc., for response and further action. In some implementations, the transmission of the notification to the emergency responders may occur after a notification has been transmitted to the caregiver. For example, if a specified number of notifications have been transmitted to the caregiver without acknowledgment, e.g. three notifications (as just one example of multiple possibilities), this may trigger the notification to the emergency responders (e.g., either an emergency line or a non-emergency line). The notification to the emergency responders may include a geographic location of the emergency cooling apparatus 216, a contact number for the subscribing caregiver, a duration of time that the child has been detected in the child car seat 118 (and/or that the cooling function has been activated), and/or other data about the situation to aid in providing emergency access/care. In other embodiments, the notification to emergency responders may occur concurrent to the notification to the subscribing users.

The child car seat 118 illustrated in FIG. 2A is for older (and/or heavier) children in a forward-facing configuration. Embodiments of the present disclosure are also applicable to child car seats 118 in rear-facing configurations, i.e. for infants and young children that are still recommended to be rear-facing for their safety. FIG. 2B is a side view of such an exemplary emergency cooling system in an exemplary vehicle environment, such as environment 100, according to aspects of the present disclosure.

Also illustrated in FIG. 2B, the child car seat 118 is designed to be rear-facing in the vehicle 102. The child car seat 118 is illustrated from a side view, and includes a front portion 224 facing towards the rear end 106 of the vehicle 102 in FIG. 1. The child car seat 118 also includes a rear portion 226 facing towards the front end 104 of the vehicle 102 (the opposite end of the child car seat 118 along an axis 213 of a base 230 of the child car seat 118). The child car seat 118 also includes a seat portion 228 extending along the axis 213 from the front portion 224 to the rear portion 226. The angle of inclination at which the child car seat 118 may vary according to a range of options, including a smaller angle (from horizontal, parallel the seat of the rear seat 112, such as less than 45°) to a larger angle closer to 90°, such as greater than 45°.

In some implementations, the emergency cooling apparatus 216 is attached to the headrest 219 of one of the front seats 120. The emergency cooling apparatus 216 is configured so that the nozzles 218 are facing towards a portion of the child car seat 118 around the front portion 224. For example, as illustrated in FIG. 2B the emergency cooling apparatus 216 is attached using a strap 220 as well, which may be formed of one or more materials that either stretch or attach to respective ends of the strap 220 (e.g., via hook-and-loop fasteners, magnetic coupling, strap coupling, adhesive coupling, etc.). The strap 220 may be releaseable so that the emergency cooling apparatus 216 is attachable and removable to multiple headrests 219 (or 116) over time, as desired. The emergency cooling apparatus 216 may be disposed elsewhere to providing cooling to a child, such as a headrest of the child car seat 118, a side of the child car seat 118, a handle of the child car seat 118, etc. (just to name a few examples).

Figures 3A, 3B:
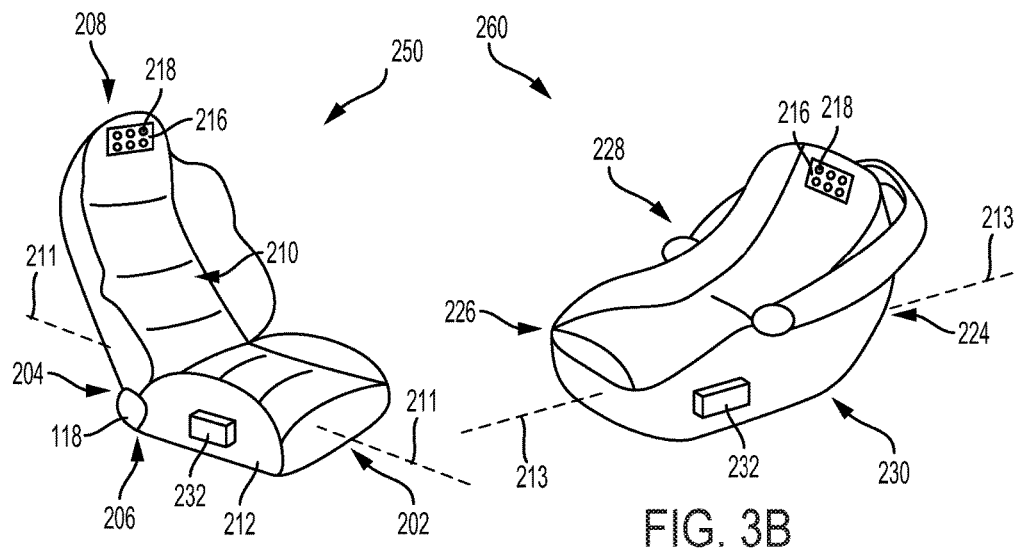
FIG. 3A is a perspective view of an exemplary emergency cooling system according to aspects of the present disclosure.
FIG. 3B is a perspective view of an exemplary emergency cooling system according to aspects of the present disclosure.

The embodiments of FIGS. 2A and 2B illustrate an emergency cooling apparatus 216 that is separate from the child car seat 118. According to other embodiments of the present disclosure, the emergency cooling apparatus 216 may be integrated with the child car seat 118. FIG. 3A is a perspective view of an exemplary emergency cooling system according to aspects of the present disclosure.

The child car seat 118 illustrated in FIG. 3A is designed to be forward-facing in the vehicle 102 and shares some common reference numbers to the child car seat 118 illustrated in FIG. 2A, including front portion 202 (facing towards the front end 104 of the vehicle 102), rear portion 204 (facing towards the rear end 106 of the vehicle 102), and backrest 210 extending from bottom 206 of the base 212 to top 208. Different from FIG. 2A, the emergency cooling apparatus 216 is integrated with the child car seat 118, shown here near the top 208 of the child car seat 118 (as an example). Accordingly, the one or more nozzles 218 are directed towards the rear of a child's head as the child is situated in the child car seat 118, i.e. resting against the backrest 210.

As illustrated in FIG. 3A, the controller 232 of the emergency cooling apparatus 216 is physically separate from the emergency cooling apparatus 216 and also integrated with, or attached to, the child car seat 118. This may be done to reduce the amount of space required for integration with the top portion of the child car seat 118 or for other considerations. The actual location may be at any other suitable portion of the child car seat 118. The controller 232 may communicate with the emergency cooling apparatus 216 via one or more wired or wireless connections, for example to communicate commands to start or stop an air flow from the nozzles 218. In other embodiments, the controller 232 may be physically a part of the emergency cooling apparatus 216.

FIG. 3B illustrates a perspective view of an exemplary emergency cooling system according to aspects of the present disclosure. The child car seat 118 illustrated in FIG. 3B, like that in FIG. 3A, illustrates an emergency cooling apparatus 216 integrated with the child car seat 118, with common reference numbers such as front portion 224, rear portion 226, and seat portion 228 extending along the axis 213 from the front portion 224 to the rear portion 226. Different from FIG. 2B, the emergency cooling apparatus 216 is integrated with the child car seat 118, shown here near front portion 224 (as an example). Accordingly, the one or more nozzles 218 are directed towards the rear of a child's head as the child is situated in the child car seat 118, i.e. resting in the seat portion 228.

Like the configuration in FIG. 3A, a controller 232 is physically separate from the emergency cooling apparatus 216. In FIG. 3B, the controller 232 is illustrated located towards the base 230 of the child car seat 118, although the actual location can be at any other suitable portion of the child car seat 118. The controller 232 may communicate with the emergency cooling apparatus 216 via one or more wired or wireless connections, for example to communicate commands to start or stop an air flow from the nozzles 218. In other embodiments, the controller 232 may be physically a part of the emergency cooling apparatus 216.

Figure 4A:
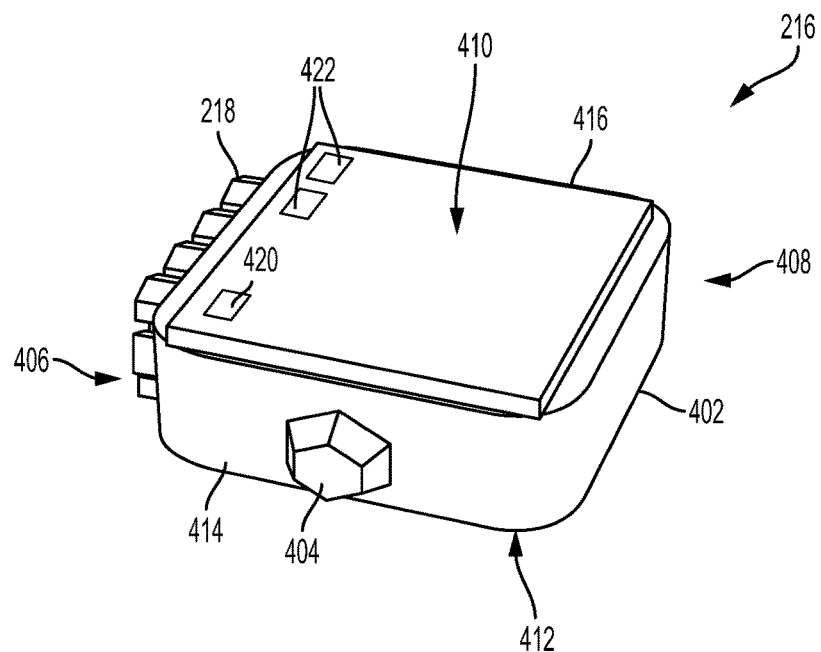
FIG. 4A is a perspective view of an exemplary emergency cooling apparatus according to aspects of the present disclosure.

FIG. 4A is a perspective view of an exemplary emergency cooling apparatus 216 according to aspects of the present disclosure. The emergency cooling apparatus 216 includes a housing 402. The housing 402 may be formed from a variety of materials, such as polymers or metals to name just two examples (or a combination of materials).

The housing 402 includes a proximal end 406, a distal end 408 at the opposite end of the proximal end 406, an upper surface 410, a bottom surface 412, and sides 414, 416. As will be illustrated in FIGS. 5A and 5B, the housing 402 is shaped to define an interior air chamber and, in some embodiments, a separate chamber to house one or more controllers. The housing 402 also includes an antenna 404, which as illustrated is attached to (or integrated/formed with) the side 414. This is exemplary; in other embodiments, the antenna 404 may be attached to, or integrated/formed with, another surface of the housing 402 including substantially flush therewith.

The housing 402 may also include one or more indicators 420 that may indicate a "normal" (i.e., safe) status and an "alert" status when the cooling device has been activated. The indicators 420 may be lights (whether flush or protruding therefrom), such as light emitting diodes (LEDs). There may be any number of indicators 420. There may also be other status levels, such as coinciding with the varying levels of action the emergency cooling apparatus 216 takes in response to sensor input—e.g., once notifications have been sent to emergency responders, the LED may indicate an "emergency" status (which in some embodiments may be accompanied by a sound, for example). The housing 402 may include one or more interfaces 422 (e.g., buttons) that can clear these statuses (as well as other buttons to allow manual control of different functions of the emergency cooling apparatus 216, such as manual activation of the cooling function). Two are illustrated, though any number may be included.

At the proximal end 406, the one or more nozzles 218 protrude from the rest of the housing 402. As illustrated, the housing 402 includes three rows of nozzles 218, in each of which a passageway exists to allow a gas, such as air, to flow through. Any number of rows of nozzles 218 may be used. Each row may contain multiple such nozzles 218; the illustrated example in FIG. 4A includes four nozzles 218 per row. The nozzles 218 may be in fluid communication with an air chamber within the housing 402. The number, shape, and arrangement of nozzles 218 illustrated in the various figures of the present application are exemplary only. Other mechanisms that allow gas such as air to flow towards a target destination (e.g., a child in a child car seat 118) are also considered within the scope of the present disclosure. The discussion will focus on the example in FIG. 4A for ease of reference.

Figure 4B:
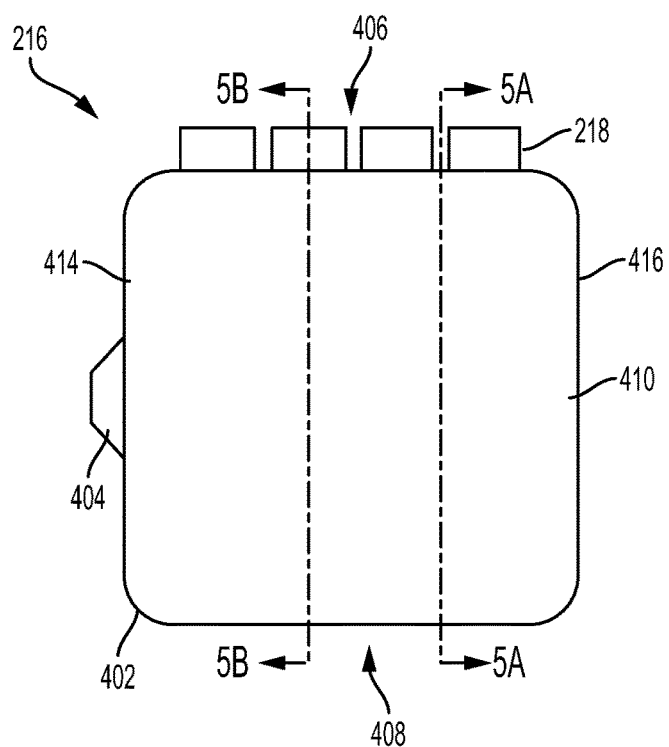
FIG. 4B is a top view of an exemplary emergency cooling apparatus according to aspects of the present disclosure.

FIG. 4B is a top view of the exemplary emergency cooling apparatus 216 according to aspects of the present disclosure, continuing with the example introduced with FIG. 4A above. The top view is of the upper surface 410, with sides 414 and 416 extending along an axis perpendicular to the axis extending from the proximal end 406 and the distal end 408. FIG. 4B identifies two cross-sections that will be further detailed in FIGS. 5A and 5B below—the line for FIG. 5A's cross section extends from potentially between nozzles 218 of a given row (if there are multiple nozzles/rows) along the axis from the proximal end 406 to the distal end 408. The line for FIG. 5B's cross section cuts through a nozzle 218 to show a cross-section thereof.

Figure 4C:
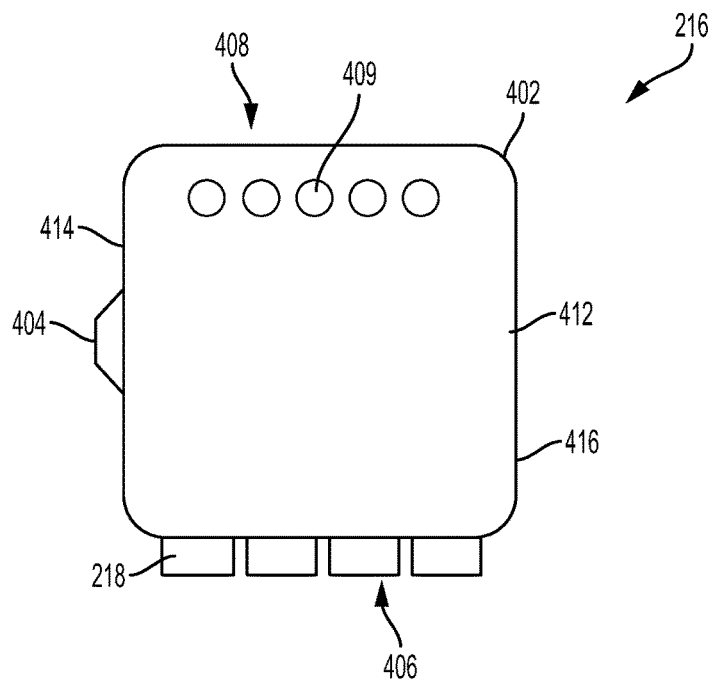
FIG. 4C is a bottom view of an exemplary emergency cooling apparatus according to aspects of the present disclosure.

Turning now to FIG. 4C, a bottom view of the exemplary emergency cooling apparatus 216 is illustrated according to aspects of the present disclosure. As illustrated, the bottom surface 412 includes an array of intake ports 409. The array of intake ports 409 may include any number of individual ports, with any shape configuration, with sufficient size to allow enough air into the chamber to cool and convey out the nozzles 218.

FIG. 4C illustrates the intake ports 409 near the distal end 408 of the housing 402. This allows the air drawn in through the intake ports 409 distance to traverse in the chamber to be cooled before being expelled from the housing 402. Although illustrated as being located at the bottom surface 412, the intake ports 409 may be located elsewhere on the housing 402, for example along the surface of the distal end 408, and/or the sides 414/416 (e.g., towards the distal end 408 to allow a distance for the air to traverse once inside the chamber of the housing 402) to name just a few examples.

Figure 4D:
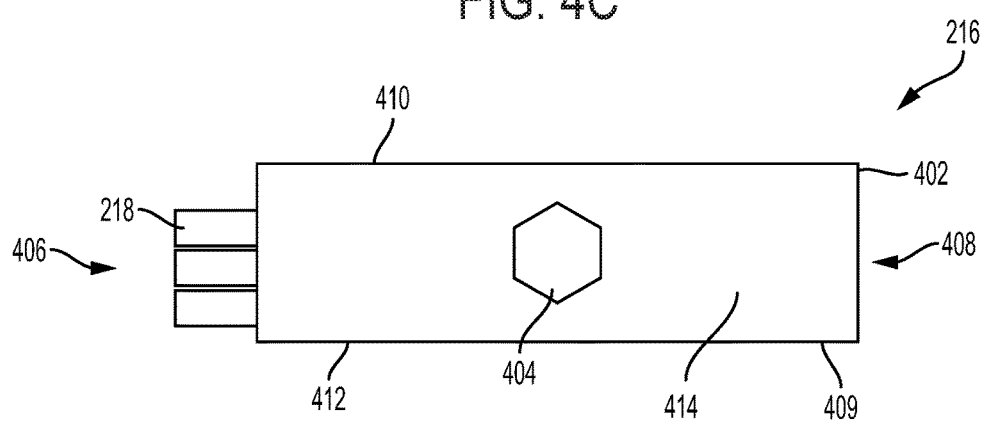
FIG. 4D is a side view of an exemplary emergency cooling apparatus according to aspects of the present disclosure.

FIG. 4D is a side view of the exemplary emergency cooling apparatus 216 according to aspects of the present disclosure. In particular, FIG. 4D provides a view of the side 414, with the proximal end 406 extending to the left in the figure (with nozzles 218, with the exemplary 3 rows discussed above) and the distal end 408 extending to the right, and the antenna 404 provided as well. In the example of FIG. 4D, the nozzles 218 are fixed in place relative to the remainder of the housing 402. To adjust a direction of air flow from the nozzles 218, the housing 402 would be adjusted.

Figure 4E:
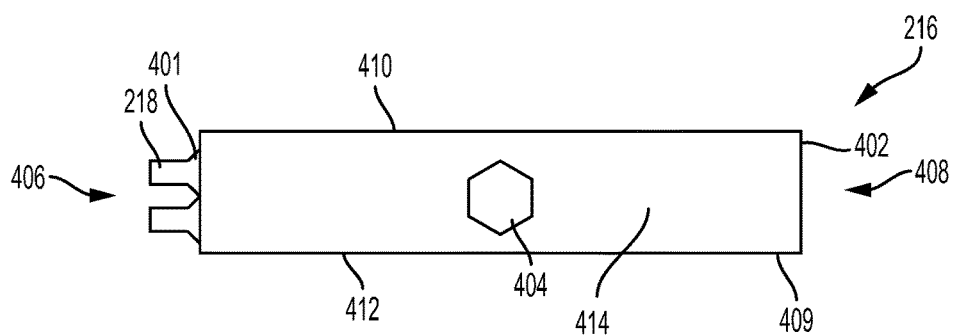
FIG. 4E is a side view of an exemplary emergency cooling apparatus according to aspects of the present disclosure.

FIG. 4E provides an alternative embodiment where the nozzles 218 are adjustable. In particular, FIG. 4E also is a side view of the exemplary emergency cooling apparatus 216 according to aspects of the present disclosure. In some implementations, the nozzles 218 may pivot relative the remainder of the housing 402 and may be connected at a joint 401. As illustrated, the nozzles 218 in FIG. 4E are each adjustable to point in different directions from each other (or in the same direction) via the joint 401. In other examples, each row of nozzles 218 may be adjustable together. Although two rows of nozzles 218 are illustrated, there may be fewer or more according to embodiments of the present disclosure.

Figure 5A:
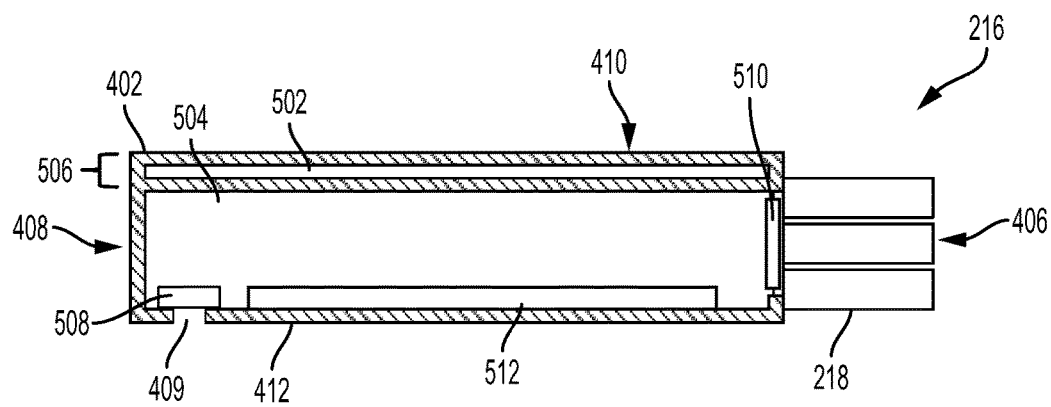
FIG. 5A is a cross-sectional view of an exemplary emergency cooling apparatus according to aspects of the present disclosure.

Turning now to FIG. 5A, a cross-sectional view of the exemplary emergency cooling apparatus 216 taken along line 5A-5A in FIG. 4B is illustrated according to aspects of the present disclosure. The view of FIG. 5A is from the perspective of the side 416 of housing 402. Therefore, the proximal end 406 is to the right of the figure and the distal end 408 is to the left of the figure. As noted previously, the cross section in FIG. 5A extends from between nozzles 218 of a given row.

As shown, the housing 402 includes a chamber 502 and a chamber 504. The chamber 502, as illustrated, is located in an upper region 506 of the housing 402. The chamber 502 provides an enclosure for one or more controllers of the emergency cooling apparatus 216 which operates according to embodiments of the present disclosure. FIG. 5A illustrates the chamber 502 as being located in an upper region 506 of the housing 402. This is exemplary; the chamber 502 may be located elsewhere in the housing 402. Alternatively, as noted with respect to FIG. 3A or 3B, the controller 232 may be physically separate from the housing 402.

The housing 402 also includes chamber 504. Chamber 504 is the chamber in which air enters (via intake ports 409) and is directed towards the nozzles 218. As illustrated, chamber 504 is located below the chamber 502, though the chambers 502, 504 may have other spatial relationships as noted above. The shape and contours of the chamber 504 may assume a variety of forms, ranging from straight angles as illustrated in FIG. 5A to curved at one or more corners of the chamber 504 (and, by extension the housing 402 where applicable). In some embodiments, the chamber 504 includes mechanisms to facilitate the flow of air from the intake ports 409 to the nozzles 218. For example, as illustrated the chamber 504 includes a first fan mechanism 508 that rotates in a direction that draws air external to the housing 402 into the chamber 504.

Further, the chamber 504 includes a second fan mechanism 510 that rotates in a direction that draws air from within the chamber towards the nozzles 218 with sufficient force to blow the air towards the intended target (e.g., a child in a child car seat 118). Although as shown as respective single entities, the first and second fan mechanisms 508, 510 may alternatively be a collection of smaller fan mechanisms, i.e. dedicated to a single port/nozzle or a subset of ports/nozzles. In alternative embodiments, the fan mechanisms 508, 510 may represent one combined fan mechanism. Fan mechanisms include fans, turbines, or any other flow inducing mechanism (such as some identified below as part of the cooling mechanism, such as an ionic wind generator, etc.).

According to embodiments of the present disclosure, the chamber 504 also includes one or more mechanisms to facilitate cooling of the air within the chamber 504 before being expelled by the second fan mechanism 510 through the nozzles 218. This is illustrated generally as cooling mechanism 512. For example, the cooling mechanism 512 may be a thermoelectric cooling plate that utilizes the Peltier effect to cool a surface of the cooling mechanism 512 that faces the interior of the chamber 504 with an electric current. The opposing surface of the cooling mechanism 512 may face the bottom surface 412 (or, in some embodiments, comprise at least a portion of the bottom surface 412). The housing 402 may further include a heat sink attached to at least a portion of the bottom surface 412 (whether the cooling mechanism 512's lower surface is in contact with or comprises part of the bottom surface 412).

Other cooling techniques may alternatively (or additionally) be applied as the cooling mechanism 512. For example, the cooling mechanism 512 may be an ionic wind generator to effectively utilize the space of the chamber 504, in which case one or both of the fan mechanisms 508, 510 may be omitted where appropriate. Another alternative may be a more traditional fan/heat sink combination similar to that used with CPUs. Another alternative may include a piezo-bellows cooling mechanism. As another example, the housing 402 may implement a thermodynamic cooling effect. Another example may include a miniature air conditioning unit using a refrigerant and a compressor. These are just some examples; others may be possible as well. Further, the placement of the different mechanisms within the chamber 504 is exemplary; other placements to further facilitate cooling of the air within the chamber 504 (and facilitate its flow, as applicable) are also possible.

Figure 5B:
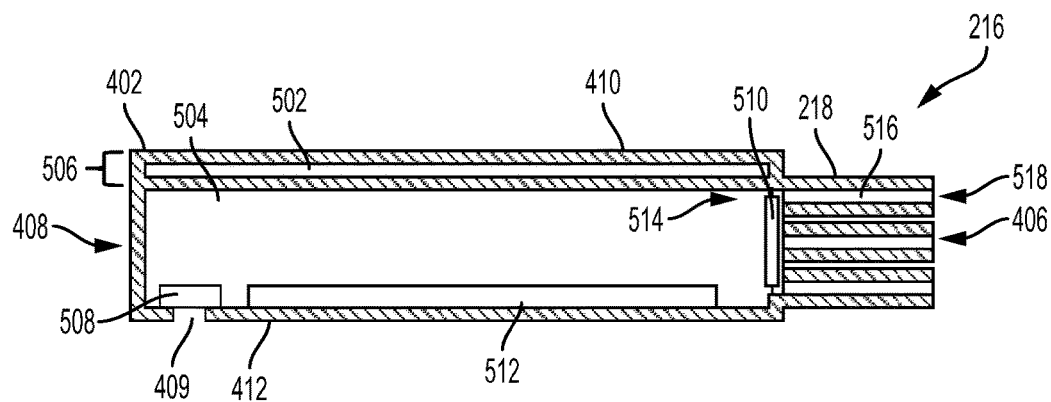
FIG. 5B is a cross-sectional view of an exemplary emergency cooling apparatus according to aspects of the present disclosure.

FIG. 5B illustrates a cross section that includes a section view of some of the nozzles 218 taken along lines 5B-5B in FIG. 4B. The example illustrated in FIG. 5B continues with the example given in FIG. 5A and discussed above, and therefore this discussion focuses on the additional elements illustrated. For example, as shown there are a plurality of exit ports 514 corresponding to the plurality of nozzles 218. After air enters an exit port 514 (e.g., impelled by the second fan mechanism 510), it traverses through an air passage 516. Each nozzle 218 may include such an air passage 516. The air passages 516 may have the same properties from start to finish, while others may include a taper. After the air traverses the air passage 516, it exits via output ports 518 (e.g., one output port 518 for a given nozzles 218, or multiple such air passages 516 and output ports 518 per nozzle 218, just to give a few examples).

Figure 6:
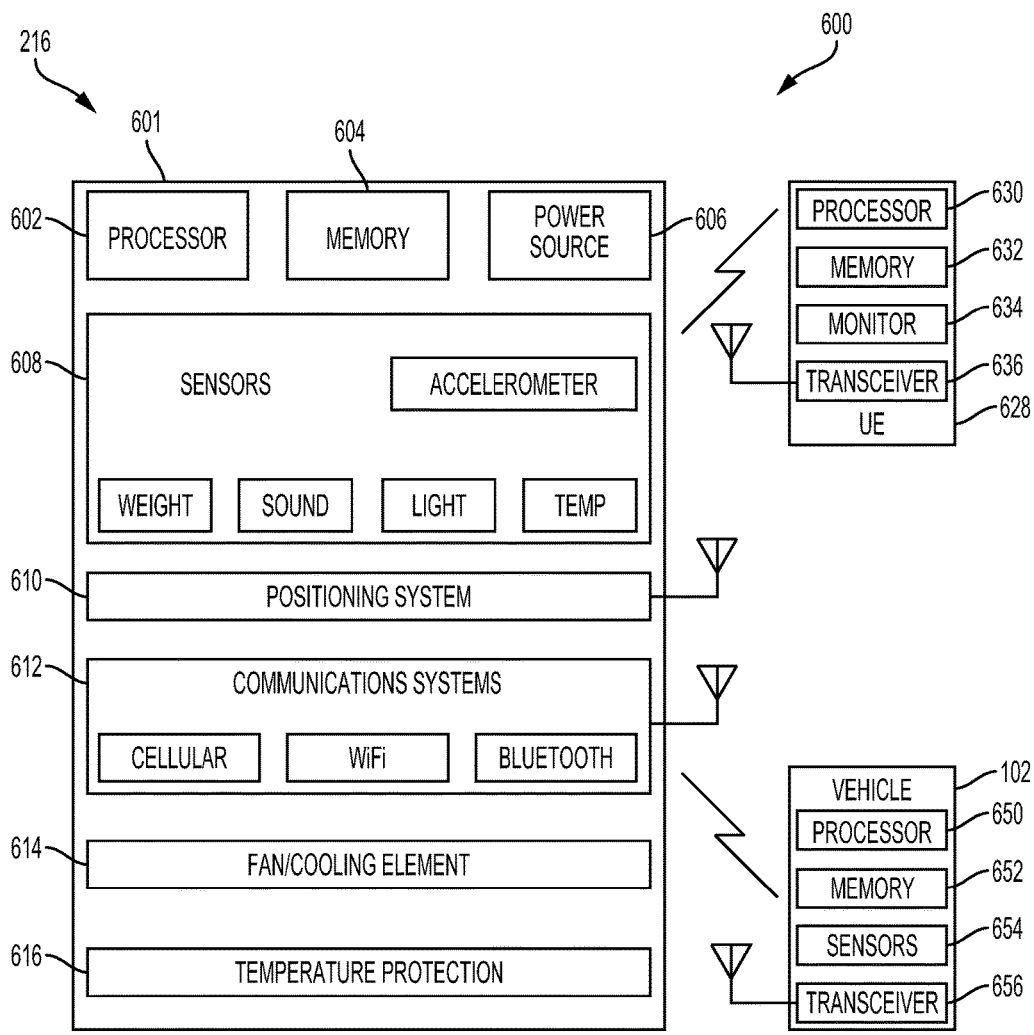
FIG. 6 is a block diagram of an exemplary emergency cooling system according to aspects of the present disclosure.

Turning now to FIG. 6, a block diagram of an exemplary emergency cooling system 600 according to aspects of the present disclosure. The exemplary emergency cooling system 600 includes emergency cooling apparatus 216, user equipment 628 (e.g., a subscribing device, a device associated with a subscribing user, referred to generally herein as a subscribing device 628), and a vehicle 102 (e.g., computer 110 introduced in FIG. 1 above).

Looking first at the emergency cooling apparatus 216, which in FIG. 6 is illustrated with respect to controller functions (e.g., that may be placed on one or more circuit boards or integrated into a system-on-chip) that may be located within the chamber 502 of FIG. 5A, 5B, identified as controller 601 in FIG. 6. As illustrated, this includes a processor 602, a memory 604, a power source 606, one or more sensors 608, a positioning system 610, a communications system 612 (e.g., one or more transceivers), a cooling element 614, and a temperature protection module 616. These elements may be in direct or indirect communication with each other, for example via one or more buses.

The processor 602 may have various features as a specific-type processor. For example, the processor 602 may be or include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein with reference to the controller 601 of the emergency cooling apparatus 216 introduced above. The processor 602 may also be implemented as a combination of computing devices, e.g., a combination of a DSP and a microprocessor, a plurality of microprocessors, one or more microprocessors in conjunction with a DSP core, or any other such configuration. Further, the processor 602 may represent a single core or processor, a multi-core processor, and/or multiple multi-core processors.

The memory 604 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some embodiments, the memory 604 may include a non-transitory computer-readable medium. The memory 604 may store instructions. The instructions may include instructions that, when executed by the processor 602, cause the processor 602 to perform operations described herein with reference to controller 601 of emergency cooling apparatus 216 in connection with embodiments of the present disclosure. In some examples, the memory may store one or more threshold temperatures and instructions for activating the emergency cooling apparatus 216. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The power source 606 may include one or more types of sources. For example, the power source 606 may include one or more batteries in a battery pack (whether disposable or rechargeable). As another example, the power source 606 may include a magnetic battery. As yet another example, the power source 606 may be an inverter connected to a power source of the vehicle 102 (e.g., plugged into an outlet of the vehicle 102 to connect with the vehicle 102's power system). This may be the sole source or a recharging source for a battery in the emergency cooling apparatus 216.

The sensors 608 may include multiple different sensors and types, whether integrated with the emergency cooling apparatus 216, attached to the emergency cooling apparatus 216, or otherwise separate from, but in communication with, the emergency cooling apparatus 216. In some examples, the sensors 608 may include a weight sensor. The weight sensor may be placed under a location that the child will be resting in the car seat 118—for example, under a cushion in the base 212 of FIG. 2A or seat portion 228 of FIG. 2B. The weight sensor may transmit its data to the controller 601 via wired (e.g., deployed underneath the cushioning) or wireless connection. As another example, the sensors 608 may include one or more sound sensors. The sound sensor may be as simple as a microphone with post processing hardware/software (e.g., either part of the sensor or in cooperation with the processor 602). Or, the sound sensor may be another type such as a laser microphone, a sensor utilizing metamaterials, or hardware/software designed to isolate voice frequencies.

Another example sensor that the sensors 608 may include is a light sensor. For example, the light sensor may be an infrared sensor that senses the presence of a child in the car seat 118. The light sensor may also be a low-powered light and detection ranging (LIDAR/LADAR) system operating at frequencies that are eye-safe. Yet another example for sensors 608 includes one or more temperature sensors. One temperature sensor may be a remote sensing device to measure the temperature of the child while in the car seat 118 (for example, triggered to begin sensing in response to another sensor identifying presence of a child such as the infrared sensor and/or the weight sensor, some combination of sensors, etc.). The temperature sensor may provide its measurements to the memory 604 for temporary and/or long term storage, e.g. for use by the processor 602 to compare against more recent measurements, identify trends, etc. A second temperature sensor may be an ambient air temperature sensor for the environment in the cabin 114 of the vehicle 102.

Yet another example sensor 608 may be an accelerometer that aids in determining whether the vehicle 102 is in motion. If in motion, the processor 602 (e.g., executing the temperature protection module 616) may determine that any action taken by the emergency cooling apparatus 216 may be limited to activating the cooling mechanism to blow air onto the child, and prevent notifications from being transmitted to subscribing devices and/or emergency responders. The prevention, for example, may be applied until it the detected movement falls below a movement threshold (e.g., close to stationary or stationary for a period of time). Or, alternatively, detecting the vehicle in motion may further prevent even air to blow, such as in embodiments where the controller 601 is in communication with a computer 110 of the vehicle 102. This may be in response to an indication that the climate control system is in operation (or, in other embodiments, in response to the second temperature sensor that detects ambient air temperature). Other sensors are also possible.

A further example of a sensor 608 is a capacitive sensor. For example, a capacitive sensor may be placed just underneath the lining of the car seat 118, or at locations on top of it, to capacatively detect the proximity of an object (such as a child) to the capacitive sensor.

The positioning system 610 may be a global navigation system such as a global positioning system (GPS). Although identified as GPS, this may alternatively be some other navigation system, including Galileo, GLONASS, BeiDou, or some other system that enables the controller 601 to determine geolocation information of the emergency cooling apparatus 216, which may then be used to determine motion and/or identify the location of the emergency cooling apparatus 216 in one or more notifications transmitted via the communications systems 612. In some embodiments, the emergency cooling apparatus 216 may, via the communications systems 612, pair with a nearby communications device, such as a UE (e.g., the subscribing device 628, such as a cellular phone, a smartphone, a personal digital assistant, a wireless modem, a laptop computer, a tablet computer, etc.), that includes its own positioning system and shares positioning information with the temperature protection module 616 of the emergency cooling apparatus 216. As a further example, instead of global navigation system information, the positioning system 610 may rely on triangulation (e.g., with multiple cell towers) to determine a position.

The communications systems 612 may include multiple different communications protocols to facilitate the emergency cooling apparatus 216 communicating with several different types of devices. For example, the communications systems 612 may include a cellular transceiver that detects and attaches to cellular networks when within coverage. As another example, the communications systems 612 may include a Wi-Fi transceiver using a Wi-Fi protocol (e.g., 802.11). Wi-Fi may be used, for example, when within mobile hotspot coverage to offload from the cellular transceiver for cost savings or improved bandwidth opportunities. As another example, the communications systems 612 may include a Bluetooth transceiver (whether Bluetooth or Bluetooth Low Energy, or some other protocol). Bluetooth may be used to pair with a subscribing device and/or the computer 110 of the vehicle 102. Yet another example for the communications systems 612 is a near field communication (NFC) transceiver for connecting with devices in close proximity.

The emergency cooling apparatus 216 also includes cooling element 614, which may be one or both of the first and second fan mechanisms 508, 510 discussed with respect to FIG. 5A above. This is illustrated in block form in FIG. 6 for ease of illustration. Depending on the implementation, the cooling element 614 may be in communication with the controller 601 yet be physically separate therefrom, while the other aspects of the controller 601 discussed above and below may be included together or be separate devices but in communication with each other.

The temperature protection module 616 may be used for various aspects of the present disclosure. The temperature protection module 616 may include various hardware components and/or software components to assist in these aspects (e.g., standalone hardware or implementation by the processor 602). For example, the temperature protection module 616 may receive sensor input from one or more of the sensors 608 discussed above. The one or more sensors 608 types configured to detect presence of a child, such as the weight sensor, sound sensor, light sensor, temperature sensor, and/or capacitive sensor provides their data at select intervals or in real time to the temperature protection module 616.

The temperature protection module 616 may first determine whether a child is present in the car seat 118. In some embodiments, a simple determination may suffice—e.g., data from the weight sensor identifying something present in the car seat 118. Since this may at times trigger a false positive (such as when someone places a bag or other object onto the car seat 118 instead of a child), some embodiments of the temperature protection module 616 may further use another input or combination of inputs to affirm the positive result from the weight sensor (or, alternatively, may use a different combination of inputs without the weight sensor input). For example, other inputs could include the inputs from the capacitive sensor (detecting proximity), the light sensor (detecting the infrared emissions from a child), the sound sensor, and/or the first temperature sensor directed towards a child location in the car seat 118.

Further, the temperature protection module 616 may determine whether the vehicle 102 is moving, has the engine running, has climate control system running, some combination thereof, etc. The temperature protection module 616 may communicate with the vehicle 102 using the Bluetooth transceiver of the communications system 612. The temperature protection module 616 uses this information to determine a status of the vehicle 102 (e.g., engine running, moving, stationary, climate control activated, etc.). These two determinations (child presence and vehicle 102 status) may be useful to conserve energy of the emergency cooling apparatus 216, since the temperature protection module 616 may prevent activation of the cooling element 614 and notifications if a child is not present or the vehicle 102 is moving/providing adequate climate control for a child's safety.

If the temperature protection module 616 determines that a child is in the car seat 118 (and the vehicle 102 is either not running or, if the engine is running, the climate control is not activated as some examples), the temperature protection module 616 further makes a determination about a health parameter of the child. For example, the temperature protection module 616 may receive child temperature data from the first temperature sensor and compare that temperature data against either a baseline temperature, a last-known temperature of the child (e.g., to obtain a differential between the two), or both. The baseline plus threshold temperatures may be stored in the memory 604. If the temperature has risen above a predetermined threshold (whether a temperature threshold, such as 102° F. or a differential change, such as 5° F. as just two exemplary values), such as a first threshold, then the temperature protection module 616 may activate a cooling function of the emergency cooling apparatus 216 using the cooling element 614.

The cooling may continue until the detected temperature of the child in the car seat 118 falls below a temperature threshold (e.g., 100° F. or a differential value of 3° or so, just to name a few non-limiting numeric examples), where the temperature protection module 616 may instruct the cooling element 614 to deactivate or reduce air velocity (to name just a few examples). The thresholds may differ so as to incorporate hysteresis into the control system. If the cooling continues for a specified duration of time, or if the detected temperature of the child continues rising above another threshold (higher than the first threshold, for example, such as one degree higher or two degrees higher), then the temperature protection module 616 may generate one or more notifications.

The temperature protection module 616 may transmit the first round of notifications to one or more subscribing devices. This may be broadcast, via the communications system 612 (using one or a combination of the cellular, Wi-Fi, Bluetooth, NFC, etc. transceivers), to all subscribing devices that are reachable. Alternatively, the temperature protection module 616 may first determine which subscribing devices may be closest in distance to the vehicle 102 and alert those first, and if no response occurs broaden out the notification transmission to other subscribing devices. This may aid in first notifying the caregiver that recently left the vehicle 102, for example.

The notification may include at least a message identifying the detected presence of a child, as well as other parameters such as a last-measured temperature of the child, a duration of time that the child has been detected in the child car seat 118, a geographic location of the emergency cooling apparatus 216 (and, thus, of the child), and a request for confirmation of receipt of the message to name just a few examples. The notification may be a message that appears in a caregiver's app, an email to a subscribed address, a text to a subscribed telephone number, etc. This notification may be sent concurrent to the cooling activating (i.e., at the threshold trigger), after a period of time of cooling, after the child's detected temperature continues to climb above another threshold as indicated above, or some combination thereof.

The temperature protection module 616 continues receiving feedback from its various sensors. The temperature protection module 616 may take further action in situations where the temperature protection module 616 has already activated cooling and notified one or more caregivers via their one or more subscribing devices, yet an acknowledgement has not been received or, even where acknowledgment has been received, the sensor data has not changed (i.e., to indicate the child is no longer present) after a set period of time (e.g., 5 to 10 minutes). For example, the temperature protection module 616 may take the further action after a specified number of notifications have been transmitted to the caregiver without acknowledgment, e.g. three notifications (as just one example of multiple possibilities). In other embodiments, the further action may occur concurrent to the notification to the subscribing users.

This further action may include generating one or more notifications to emergency responders e.g. a fire department, a police department, a private contractor, etc., for response and further action. The one or more notifications to emergency responders may be transmitted via the communications systems 612, such as using one or more of the cellular transceiver, Wi-Fi transceiver, Bluetooth transceiver, NFC transceiver, etc. The one or more notifications to emergency responders may include a geographic location of the emergency cooling apparatus 216, a contact number for the subscribing caregiver, a duration of time that the child has been detected in the child car seat 118 (and/or that the cooling function has been activated), and/or other data about the situation to aid in providing emergency access/care. As subscribing users and/or emergency responders are notified, the emergency cooling apparatus 216 may continue providing a flow of air toward the child to aid in cooling the child until aid arrives.

Exemplary emergency cooling system 600 also includes the subscribing device 628, which according to embodiments of the present disclosure is a subscribing device for a subscribing user. The subscribing device 628 may include a processor 630, a memory 623, a monitoring app 634, and a transceiver 636. These elements may be in direct or indirect communication with each other, for example via one or more buses.

The processor 630 may have various features as a specific-type processor. For example, these may include a CPU, a DSP, an ASIC, a controller, an FPGA device, another hardware device, a firmware device, or any combination thereof configured to perform the operations described herein with reference to subscribing devices. The processor 630 may also be implemented as a combination of computing devices, e.g., a combination of a DSP and a microprocessor, a plurality of microprocessors, one or more microprocessors in conjunction with a DSP core, or any other such configuration.

The memory 632 may include a cache memory (e.g., a cache memory of the processor 630), RAM, MRAM, ROM, PROM, EPROM, EEPROM, flash memory, solid state memory device, hard disk drives, other forms of volatile and non-volatile memory, or a combination of different types of memory. In some embodiments, the memory 632 may include a non-transitory computer-readable medium. The memory 632 may store instructions that, when executed by the processor 630, cause the processor 630 to perform operations described herein with reference to a subscribing device (UE) in connection with embodiments of the present disclosure.

The monitoring app 634 may be an application installed on the user's subscribing device 628 that is configured to receive notifications conveyed via the transceiver 636 from the controller 601. The notification may include at least a message identifying the detected presence of a child, as well as other parameters such as a last-measured temperature of the child, a duration of time that the child has been detected in the child car seat 118, a geographic location of the emergency cooling apparatus 216 (and, thus, of the child), and a request for confirmation of receipt of the message to name just a few examples. This notification to the monitoring app 634 may be sent via the communications system 612 of the controller 601 concurrent to the cooling activating (i.e., at the threshold trigger), after a period of time of cooling, after the child's detected temperature continues to climb above another threshold as indicated above, or some combination thereof.

In response to the notification, the monitoring app 634 may cause the notification to be displayed prominently on a screen of the subscribing device 628. Further, the monitoring app 634 may also cause audible and/or visual alerts to be provided from the subscribing device 628 to quickly draw attention to a user of the subscribing device 628. The monitoring app 634 may also provide a dialog box to the user to select a confirmation response/forward the notification to another device/alert emergency responders/etc.

The monitoring app 634 may further provide information to the user of the subscribing device 628 in non-alert/non-emergency scenarios, for example to provide location information for the emergency cooling apparatus 216 (e.g., with the controller 601 providing location data on a regular basis regardless of whether alert notifications are generated or not).

The transceiver 636 may be a cellular transceiver, for example as discussed above with respect to communications systems 612, a Wi-Fi transceiver as also discussed, some other transceiver type, or some combination of the above that enables the subscribing device 628 communicate with other devices (wirelessly or wired).

Exemplary emergency cooling system 600 also includes the vehicle 102, which according to embodiments of the present disclosure is a vehicle in which an emergency cooling apparatus 216 is located. More particularly, the aspects illustrated in FIG. 6 of the vehicle 102 pertain to the computer 110 introduced in FIG. 1 above. Reference will be made for this discussion to the computer 110. The computer 110 may include a processor 650, a memory 652, one or more sensors 654, and a transceiver 656. These elements may be in direct or indirect communication with each other, for example via one or more buses.

The processor 650 may have various features as a specific-type processor. For example, these may include a CPU, a DSP, an ASIC, a controller, an FPGA device, another hardware device, a firmware device, or any combination thereof configured to perform the operations described herein with reference to vehicles 102. The processor 650 may also be implemented as a combination of computing devices, e.g., a combination of a DSP and a microprocessor, a plurality of microprocessors, one or more microprocessors in conjunction with a DSP core, or any other such configuration.

The memory 652 may include a cache memory (e.g., a cache memory of the processor 650), RAM, MRAM, ROM, PROM, EPROM, EEPROM, flash memory, solid state memory device, hard disk drives, other forms of volatile and non-volatile memory, or a combination of different types of memory. In some embodiments, the memory 652 may include a non-transitory computer-readable medium. The memory 652 may store instructions that, when executed by the processor 650, cause the processor 650 to perform operations described herein with reference to a computer 110 of a vehicle 102 in connection with embodiments of the present disclosure.

The one or more sensors 654 may include a weight sensor in the rear seat 112, speed sensors, fluid sensors (e.g., oxygen, fuel, etc.), pressure sensors, temperature sensors (for engine and/or cabin 114, etc.), throttle sensors, etc.

The transceiver 656 may be one or more transceivers according to one or more protocols, similar to the communications systems 612 of the controller 601. This may include a Bluetooth transceiver, a Wi-Fi transceiver, and/or a cellular transceiver (to name just a few examples). The computer 110 of the vehicle 102 may communicate with the controller 601 different sensor and status information to the controller 601. This may include movement information, engine status information, climate control information, etc. The transceiver 656 may also may also receive information and/or instructions from the controller 601, for example an alert and/or a command to activate or modify climate control parameters, which the processor 650 may then implement.

Turning now to FIG. 7, a flow diagram is illustrated of a method 700 for providing emergency cooling monitoring and control according to aspects of the present disclosure. In an embodiment, the method 700 may be implemented by the processor 602 of the controller 601 of the emergency cooling apparatus 216, executing computer-readable instructions to perform the functions described herein. It is understood that additional steps can be provided before, during, and after the steps of method 700, and that some of the steps described can be replaced or eliminated for other embodiments of the method 700.

At block 702, the controller 601 receives a first sensor input. For example, this first sensor input may be one of the sensors 608 identified above, such as the weight sensor, sound sensor, light sensor, temperature sensor, or capacitive sensor. This may be received periodically or in real time (or anytime it changes).

At block 704, the controller 601 receives a second sensor input. This second sensor input may be another of the sensors 608 identified above, such as the weight sensor, sound sensor, light sensor, temperature sensor, or capacitive sensor. This may be received periodically or in real time as well. For example, the first sensor input may be a weight reading while the second sensor input is a light sensor reading (e.g., infrared data). These are exemplary only; any combination of sensor inputs may be received at blocks 702, 704, and in any order (i.e., one may arrive before the other, approximately at the same time, etc.).

At block 706, the controller 601 compares the first and second sensor inputs to respective thresholds (e.g., that are stored in memory 604) to determine if they fall within or without the thresholds. For example, with a weight reading being the first sensor input, the controller 601 may compare the weight reading against a stored weight threshold that may be a fixed value or a programmable value on a per-user basis. As another example, with an infrared data being the second sensor input, the controller 601 may compare the infrared data against a predetermined light profile to determine if there is a match.

Whatever the sensor data that is compared, at decision block 708 the controller 601 determines whether the first and second sensor inputs fall within or without their respective thresholds. Continuing with the weight and infrared data example for ease of illustration, if the weight reading has a value greater than (or greater than or equal to) the stored weight threshold, then this identifies a positive result. Further, if the infrared data has more hits than the predetermined light profile, then this identifies another positive result. At decision block 708, if either of the sensor inputs did not have a positive result, then the method 700 returns to block 702 to continue monitoring.

If, instead, the controller 601 identified a positive result from both sensor inputs (two is just an example; any number of combinations of sensor inputs may be used to rule out false positives), then the method 700 proceeds to block 710. Although discussed with respect to two inputs to reduce the incidence of false positives, the method 700 may utilize a single value from a single sensor input as well, and would function similarly as laid out above for a single sensor. It is noted that if at any time the child is detected as no longer present, then the method 700 pauses and loops at blocks 702-708 until a child is again detected.

At block 710, the controller 601 receives a temperature sensor input. In an embodiment, the controller 601 receives temperature sensor data about a child in the car seat 118. In another embodiment, the controller 601 receives temperature sensor data instead about the ambient air temperature of the cabin 114. In yet other embodiments, a combination of the values may be used.

At decision block 712, the controller 601 determines whether the temperature received at block 710 is above a temperature threshold, for example either a differential threshold value or an absolute temperature value (whether a temperature threshold, such as 102° F., or a differential change, such as 5° F. as just two exemplary values). If the temperature (or differential) is not above the temperature threshold, then the method 700 returns to block 702 and proceeds as laid out above and below.

If, instead, the temperate (or differential) is above the temperature threshold (or greater than or equal to), then the method 700 proceeds to block 714.

At block 714, the controller 601 activates the cooling function of the emergency cooling apparatus 216 in response to the decision at decision block 712. This may be, for example, in the form of asserting an activation command (e.g., a signal) to the cooling element 614.

At block 716, the controller 601 receives accelerometer data from the accelerometer of the sensors 608. This may be received periodically or in real time as anything changes.

At decision block 718, the controller 601 determines whether the emergency cooling apparatus 216 is in motion or not, which is presumed to correspond to movement of the vehicle 102 in which the emergency cooling apparatus 216 is located. This may additionally or alternatively include position data from the positioning system 610 to determine if the emergency cooling apparatus 216 (and by extension, vehicle 102) is moving. If it is determined that the vehicle 102 is in motion, then the method 700 proceeds to block 720.

At block 720, the controller 601 delays generating and transmitting a notification to subscriber devices or emergency responders. From block 720, the method 700 returns to block 714 to continue monitoring for motion, so long as the child is still detected as present in the car seat 118.

Returning to decision block 718, if instead it is determined that the vehicle is not moving, then the method 700 proceeds to block 722. This may delay in occurring until a connection with the computer 110 of the vehicle 102 (where existing) is broken, signifying that the vehicle 102 has been at least momentarily deactivated.

At block 722, the controller 601 receives another temperature value from the temperature sensor directed toward the child in the car seat 118. The controller 601 compares this to another threshold above the first threshold mentioned at decision block 712, and if the temperature has not risen above the next threshold then the method 700 returns to block 720 and as outlined above. Alternatively, instead of another temperature threshold comparison, the controller 601 may determine if the cooling function has been activated for longer than a set period of time. Whether exceeding another temperature threshold or set period of time, the method 700 proceeds to block 724.

At block 724, the controller 601 receives location data from the positioning system 610. Although illustrated as occurring at this point of method 700, the location data may be provided to the controller 601 at regular intervals, which the controller 601 may either accept or discard at its discretion and need.

At block 726, the controller 601 generates a notification. The generation may include compilation of multiple data points. For example, the notification may include a message identifying the detected presence of a child, as well as other parameters such as a last-measured temperature of the child, a duration of time that the child has been detected in the car seat 118, a geographic location of the emergency cooling apparatus 216 (and, thus, of the child), and a request for confirmation of receipt of the message to name just a few examples.

At block 728, the controller 601 transmits the notification generated at block 726 to one or more subscribing devices, such as of the caregiver(s), relatives, etc., identified as the subscribing device 628 in FIG. 6. In some embodiments, this occurs first to allow the caregiver or someone else to return to the vehicle 102 and resolve the potentially dangerous situation.

Figure 7A:
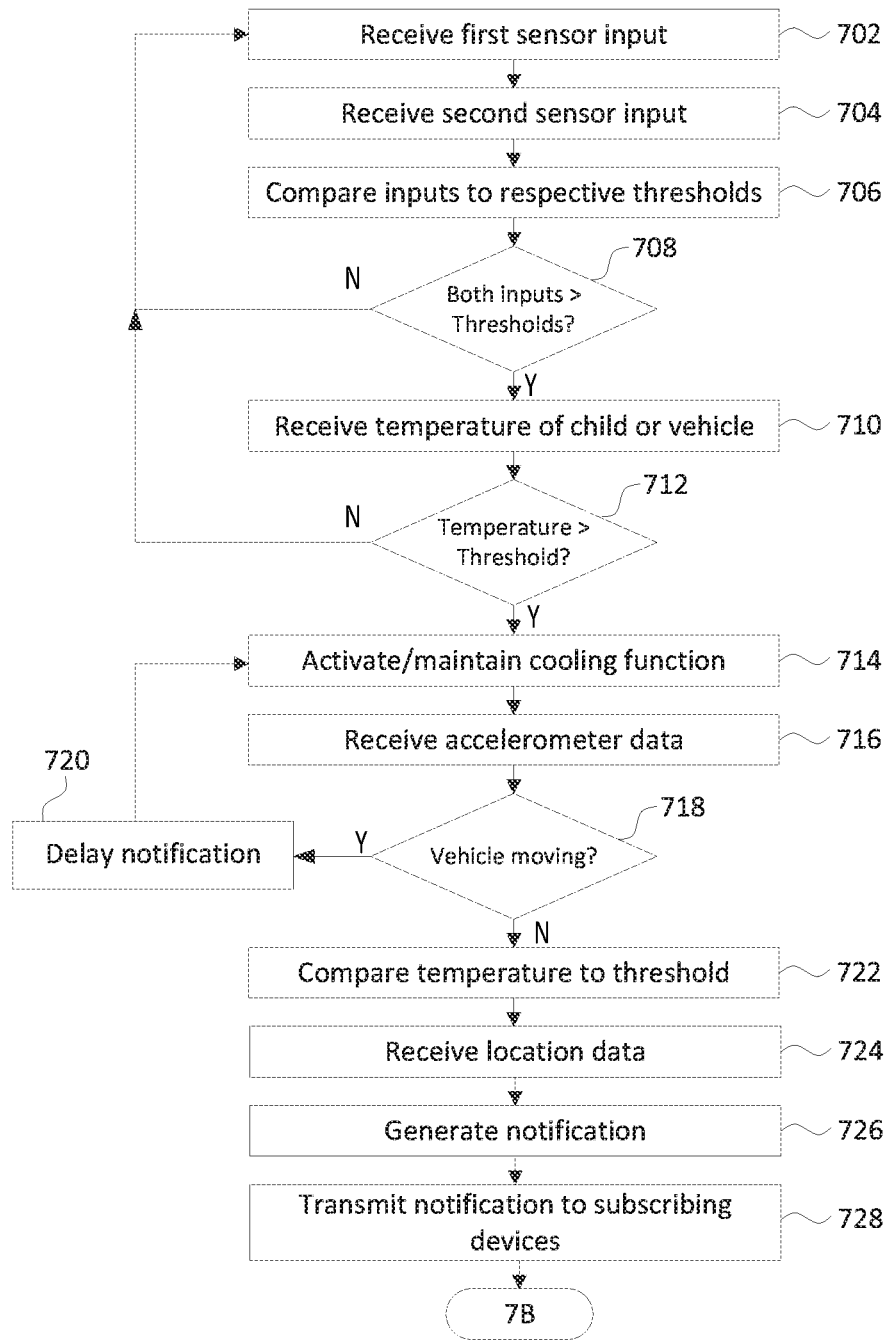
FIG. 7A is a flow diagram of an exemplary method of providing emergency cooling monitoring and control according to aspects of the present disclosure.
Figure 7B:
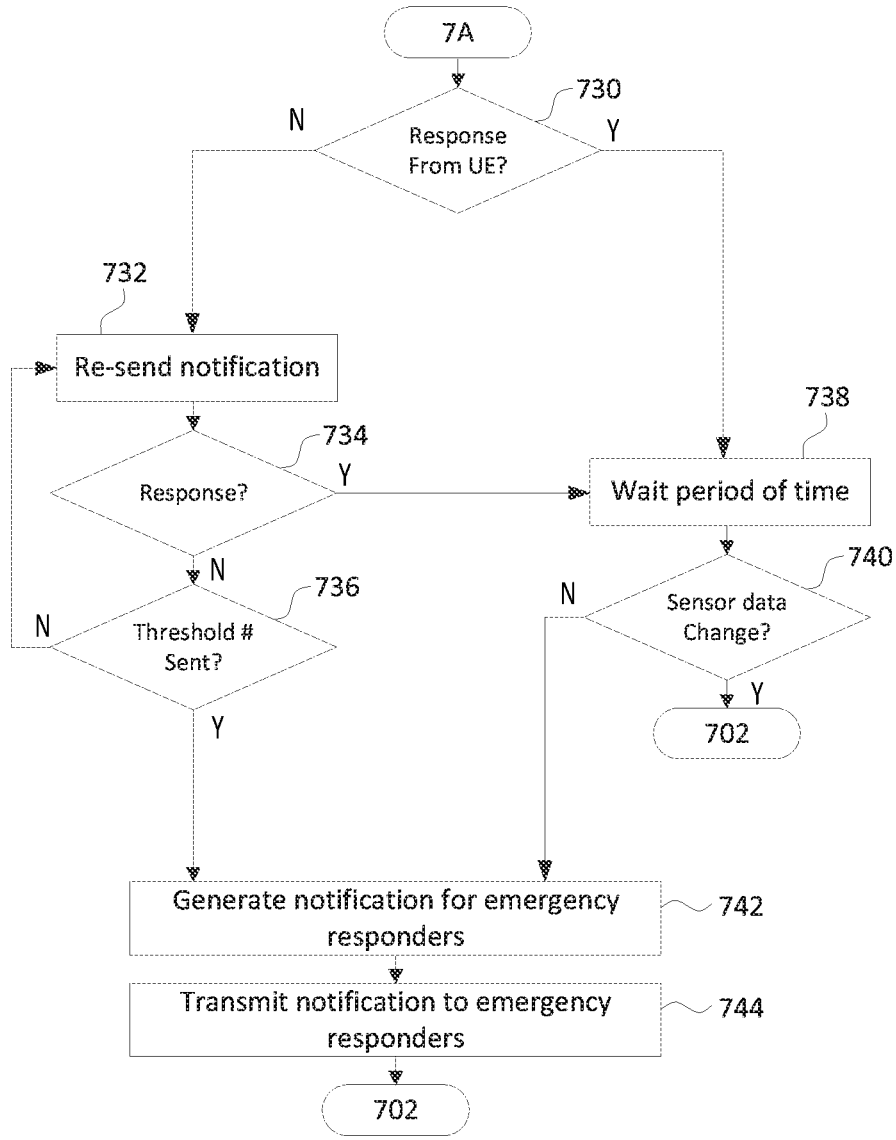
FIG. 7B is a flow diagram of an exemplary method of providing emergency cooling monitoring and control according to aspects of the present disclosure.

The method 700 proceeds from block 728 in FIG. 7A to the aspects of method 700 illustrated as part of FIG. 7B, which is a flow diagram of an exemplary method of providing emergency cooling monitoring and control according to aspects of the present disclosure. FIG. 7B is a continuation of the method 700 from FIG. 7A.

At decision block 730, after transmitting the notification to subscribing devices, the controller 601 determines whether it has received a response from one or more of the subscribing devices (e.g., UEs 628) to which a notification had been sent.

If no response had been received, the method 700 proceeds to block 732. At block 732, the controller 601 causes the notification to be resent to the subscribing devices. In some embodiments where the subscribing devices nearest the location of the emergency cooling apparatus 216 are selected first, this re-sending may include broadening out how many recipients from any subscribing devices receive the notification. In other embodiments, the notification is sent to the same subscribing devices as the first time. Further, in some embodiments the notification may be the same each time, while in other embodiments the notification may be modified with additional sensor data prior to each transmission.

At decision block 734, the controller 601 determines whether it has received a response from the subscribing device(s). If not, then the method 700 proceeds to decision block 736.

At decision block 736, the controller 601 determines whether the notification, modified or the same, has been resent a threshold number of times (e.g., three notifications as just one example, with others possible). If not, then the method 700 returns to block 732 and the notification is resent again, proceeding as laid out above and below.

If, instead, the threshold number of times has been reached, then the method 700 proceeds to block 742.

Returning again to decision block 734, if the controller 601 determines that it has received a response from the subscribing device 628, then the method 700 proceeds to block 738.

Returning to decision block 730, if the controller 601 has received a response from the subscribing device 628, then the method 700 proceeds to block 738.

At block 738, the controller 601 waits for a period of time, e.g. to allow the subscribing user to coordinate action to check the vehicle 102 and remove the child from the car seat 118. This may be on the order of 5 to 10 minutes, for example. This may take the form of a specified periodicity.

At decision block 740, the controller 601 determines whether the sensor data has changed (e.g., to indicate that the child is no longer present in the car seat 118). If the sensor data indicates to the controller 601 that the child has been removed, then the method 700 returns to block 702 and proceeds again. If the sensor data indicates that the child has not yet been removed (even after user confirmation of receipt of the notification), then the method 700 proceeds to block 742.

Thus, method 700 may reach block 742 from either the user of a subscribing device 628 not responding to notification(s), or the child not being removed from the car seat 118 after a period of time has elapsed. At block 742, the controller 601 generates a notification for emergency responders. The notification for emergency responders may include a geographic location of the emergency cooling apparatus 216, a contact number for the subscribing caregiver, a duration of time that the child has been detected in the child car seat 118 (and/or that the cooling function has been activated), and/or other data about the situation to aid in providing emergency access/care.

At block 744, the controller 601 transmits the notification to emergency responders (e.g., an emergency address or non-emergency address). The method 700 then returns to block 702 once the child has been safely rescued from the car seat 118. The emergency notifications to the emergency responders may be copied to the subscribing users at the same time as well.

Figure 8:
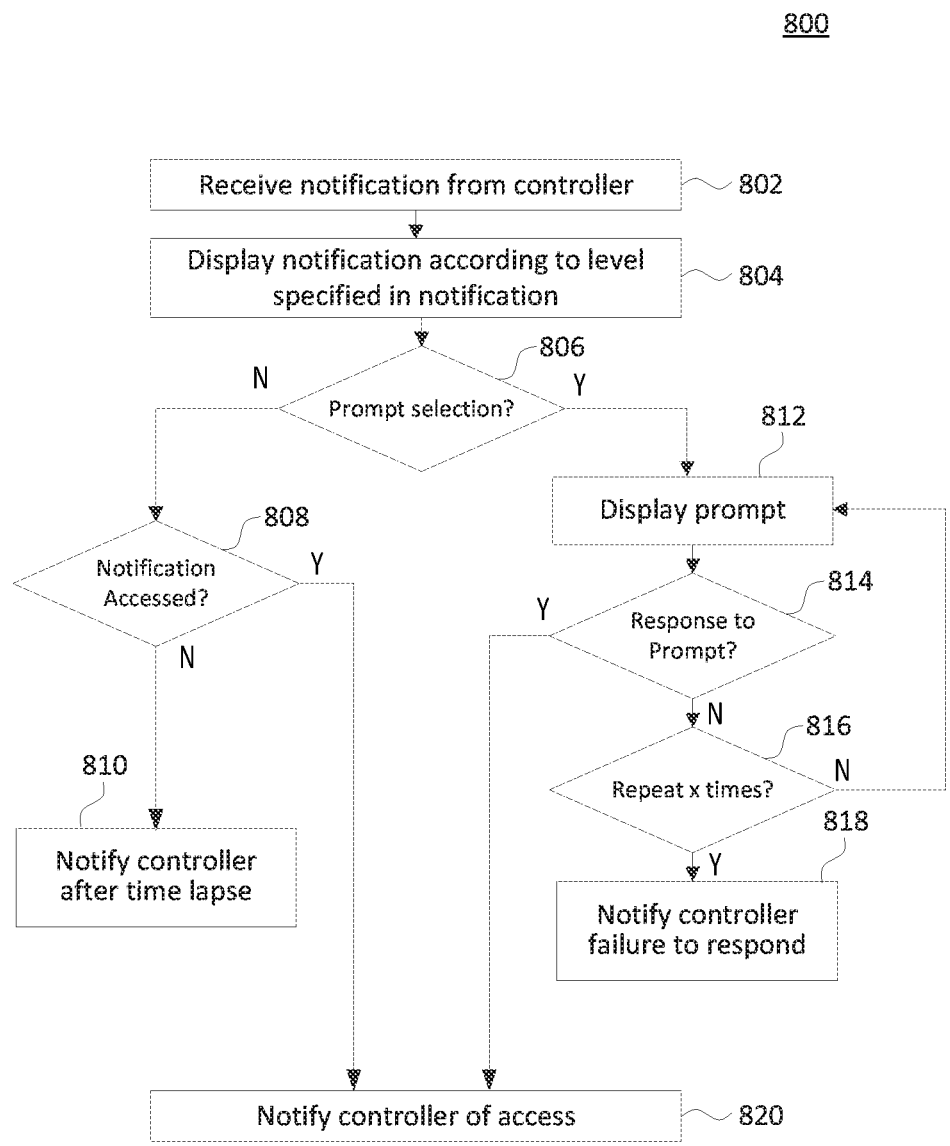
FIG. 8 is a flow diagram of an exemplary method of subscribing device monitoring and control according to aspects of the present disclosure.

FIG. 8 is a flow diagram of an exemplary method 800 of subscribing device monitoring and control according to aspects of the present disclosure. In an embodiment, the method 800 may be implemented by the subscribing device 628 via processor 630, executing computer-readable instructions to perform the functions described herein. It is understood that additional steps can be provided before, during, and after the steps of method 800, and that some of the steps described can be replaced or eliminated for other embodiments of the method 800.

At block 802, the subscribing device 628 receives a notification from a controller 601 of an emergency cooling apparatus 216. The notification may include identifying the detected presence of a child, as well as other parameters such as a last-measured temperature of the child, a duration of time that the child has been detected in the child car seat 118, a geographic location of the emergency cooling apparatus 216 (and, thus, of the child), and a request for confirmation of receipt of the message to name just a few examples.

At block 804, the subscribing device 628 displays the notification received at block 802 for user attention/action according to a priority level included in the notification. For example, display may include a passive notification for a lower priority level, with higher priority levels including more urgent messaging approaches including audible and visible cues, up to persistent and non-cancellable ringing/buzzing/some combination thereof until the notification is accessed and handled.

At decision block 806, if the subscribing device 628 is instructed to provide a prompt with the notification, then the method 800 proceeds to block 812. If instead no prompt is required outside of a passive notification, then the method 800 proceeds to decision block 808.

At decision block 808, if the notification is not accessed (e.g., by unlocking the subscribing device 628 and reviewing the message, whether as part of an email or text client or part of a monitoring app 634), then the method 800 proceeds to block 810.

At block 810, after a time is allowed to lapse (such as seconds or around a minute), the subscribing device 628 (e.g., via the monitoring app 634) notifies the controller 601 of the failure to access the notification. The controller 601 will then proceed as laid above with respect to FIG. 7.

Returning to decision block 808, if the notification is accessed, then the method 800 proceeds to block 820.

At block 820, the subscribing device 628 via the monitoring app 634 notifies the controller 601 that access of the notification occurred. The controller 601 will proceed as laid out in FIG. 7, including re-sending the notification and/or notifying emergency responders if the child is not removed from the car seat 118 within a period of time.

Returning to decision block 806, if subscribing device 628 is instructed to provide a prompt with requested response/selection, then the method 800 proceeds to block 812.

At block 812, the subscribing device 628 displays the prompt, such as via the monitoring app 634. The prompt may be a pop-up window, a webpage, an app screen, etc., with a prompt for the user to actively make a selection among options, such as to confirm that the notification has been received, enter in an estimated time of arrival to the location identified with the notification, enter contact information for an alternative person to contact for immediate response, or to immediately notify emergency responders (to name just a few examples).

At decision block 814, if a response to the prompt is received, then the subscribing device 628 processes the response and the method 800 proceeds to block 820, where the controller 601 is notified of the response to the prompt.

Returning to decision block 814, if a response has not yet been received, then the method 800 proceeds to decision block 816.

At decision block 816, the subscribing device 628 determines whether the prompt has already been repeated a specified number of times to the user of subscribing device 628. If not, then the method 800 returns to block 812 and displays the prompt to the user again. In some embodiments, each return to block 812 up to the specified number of times may escalate the intensity of the prompt to grab the user's attention.

Returning to decision block 816, if instead the prompt has already been repeated the specified number of times, and no response/selection to the prompt has been received, then the method 800 proceeds to block 818.

At block 818, the subscribing device 628 notifies the controller 601 that the user has failed to respond to the prompt. This may result in the controller 601 preparing another notification to the subscribing devices including subscribing device 628, preparing a notification for emergency responders, or both as further discussed above.

In some embodiments, the computing system is programmable and is programmed to execute processes including the processes of methods 700 and/or 800 discussed herein. Accordingly, it is understood that any operation of the computing system according to the aspects of the present disclosure may be implemented by the computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include for example non-volatile memory including magnetic storage, solid-state storage, optical storage, cache memory, and Random Access Memory (RAM).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A child cooling and alerting apparatus, comprising:
   a first sensor configured to detect a presence of a child in a car seat with which the child cooling and alerting apparatus is in communication;
   a second sensor configured to detect a temperature of the child present in the car seat;
   a fan configured to blow air directed at the child in the car seat in response to an activation command;
   a processor configured, in response to the first sensor detecting the presence of the child, to compare the detected temperature of the child to a threshold temperature, assert the activation command in response to the detected temperature exceeding the threshold temperature, and activate an alert notification in response to the assertion of the activation command; and
   a transceiver configured to transmit the alert notification to a subscribing device.

2. The child cooling and alerting apparatus of claim 1, further comprising:
   a third sensor configured to detect an ambient air temperature; and
   a global positioning system device configured to determine a position of the child cooling and alerting apparatus and communicate the position to the subscribing device in response to the transceiver transmitting the alert notification to the subscribing device.

3. The child cooling and alerting apparatus of claim 1, further comprising:
   an accelerometer sensor configured to detect movement of the child cooling and alerting apparatus, wherein the processor is further configured to prevent activation of the alert notification until the detected movement falls below a stationary threshold.

4. The child cooling and alerting apparatus of claim 1, wherein the processor is further configured to activate the alert notification in response to a first time period elapsing after the activation command is asserted, and the transceiver is further configured to:
   re-transmit the alert notification to the subscribing device after a second time period after the first time period has elapsed; and
   re-transmit the alert notification to an emergency response provider after a third time period has elapsed after the second time period.

5. The child cooling and alerting apparatus of claim 1, wherein the processor is further configured to activate the alert notification after the activation command is asserted, and the transceiver is further configured to:
   re-transmit the alert notification to the subscribing device according to a specified periodicity; and
   re-transmit the alert notification to an emergency response provider in response to a number of retransmissions according to the specified periodicity reaching a threshold transmission number.

6. The child cooling and alerting apparatus of claim 1, wherein the first sensor comprises:
   a weight sensor configured to detect a weight of the child in the car seat; and
   a sound monitor sensor configured to detect noise from the child,
   wherein the processor is further configured to delay comparing the detected temperature of the child to the threshold temperature and activating the alert notification until both the weight sensor detects the weight and the sound monitor sensor detects the noise to confirm the presence of the child.

7. The child cooling and alerting apparatus of claim 1, wherein:
   the transceiver further comprises a Bluetooth transceiver configured to communicate with a vehicle Bluetooth transceiver of a vehicle in which the car seat is situated, and
   the processor is further configured to detect, via the Bluetooth transceiver communicating with the vehicle Bluetooth transceiver, that the vehicle is running with climate control, and delay activating the alert notification until connection with the vehicle Bluetooth transceiver is broken.

8. A method for child cooling and alerting, comprising:
   detecting, by a first sensor of a child cooling and alerting apparatus, a presence of a child in a car seat;
   detecting, by a second sensor of the child cooling and alerting apparatus, a temperature of the child present in the car seat;
   comparing, by a processor of the child cooling and alerting apparatus, the detected temperature to a threshold temperature;
   activating, by the processor, a fan of the child cooling and alerting apparatus in response to the detected temperature exceeding the threshold temperature; and
   transmitting, by a transceiver of the child cooling and alerting apparatus, an alert notification to a subscribing device in response to the activating the fan.

9. The method of claim 8, further comprising:
   determining, by a global positioning system of the child cooling and alerting apparatus, a position of the child cooling and alerting apparatus; and
   including, by the processor, the position in the alert notification to the subscribing device.

10. The method of claim 8, further comprising:
    detecting, by an accelerometer of the child cooling and alerting apparatus, movement of the child cooling and alerting apparatus; and
    preventing, by the processor, activating of the alert notification until the movement detected falls below a stationary threshold.

11. The method of claim 8, wherein the transmitting the alert notification further comprises delaying transmission until a first time period has elapsed after the activating the fan, the method further comprising:
    re-transmitting, by the transceiver, the alert notification to the subscribing device after a second time period after the first time period has elapsed; and
    re-transmitting, by the transceiver, the alert notification to an emergency response provider after a third time period has elapsed after the second time period.

12. The method of claim 8, further comprising:
re-transmitting, by the transceiver, the alert notification to the subscribing device according to a specified periodicity; and
re-transmitting, by the transceiver, the alert notification to an emergency response provider in response to a number of retransmissions according to the specified periodicity reaching a threshold transmission number.

13. The method of claim 8, wherein the first sensor comprises a weight sensor configured to detect a weight of the child and a sound monitor sensor configured to detect noise from the child, the method further comprising:
delaying, by the processor, the activating until both the weight sensors detects the weight and the sound monitor sensor detects the noise to confirm the presence of the child.

14. The method of claim 8, further comprising:
communicating, by the transceiver via a Bluetooth protocol, a vehicle transceiver in which the car seat is situated; and
detecting, by the processor via the transceiver communicating with the vehicle transceiver, that the vehicle is running with climate control; and
delaying, by the processor, the transmitting the alert notification until connection with the vehicle transceiver is broken.

15. An apparatus, comprising:
a housing configured to couple to a car seat;
a sensor configured to detect a temperature of a child present in the car seat;
a fan configured within a chamber of the housing and arranged to move air out of the housing and directed toward the child in response to an activation command;
a nozzle in fluid communication with the chamber and configured to receive the air from the fan and direct the air toward the child;
a processor configured to compare the detected temperature to a threshold temperature, assert the activation command in response to the detected temperature reaching the threshold temperature, and activate an alert notification in response to the assertion of the activation command; and
a transceiver configured to transmit the alert notification to a subscribing device.

16. The apparatus of claim 15, wherein the nozzle comprises a plurality of independently adjustable nozzles.

17. The apparatus of claim 15, further comprising:
a global positioning system device configured to determine a location of the apparatus and provide the location to the processor for inclusion with the alert notification; and
an accelerometer sensor configured to detect movement of the housing, the processor further configured to prevent activation of the alert notification until the detected movement falls below a stationary threshold.

18. The apparatus of claim 15, wherein the processor is further configured to delay the transmission of the alert notification until a first time period has elapsed after activating the fan, and the transceiver is further configured to:
re-transmit the alert notification to the subscribing device after a second time period after the first time period has elapsed; and
re-transmit the alert notification to an emergency response provider after a third time period has elapsed after the second time period.

19. The apparatus of claim 15, further comprising a strap system configured to releasably couple the housing to the car seat.

20. The apparatus of claim 15, wherein the transceiver comprises a cellular transceiver and a Wi-Fi transceiver, the processor being further configured to:
determine which of the cellular transceiver and the Wi-Fi transceiver has a best connection for transmission of the alert notification and make a selection for transmission of the alert notification based on the determination.

* * * * *